US011256350B2

(12) United States Patent
Zhou et al.

(10) Patent No.: US 11,256,350 B2
(45) Date of Patent: Feb. 22, 2022

(54) TOUCH DISPLAY PANEL

(71) Applicant: WUHAN STAR OPTOELECTRONICS SEMICONDUCTOR DISPLAY TECHNOLOGY CO., LTD., Hubei (CN)

(72) Inventors: Sisi Zhou, Hubei (CN); Ningkun Peng, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 188 days.

(21) Appl. No.: 16/755,579

(22) PCT Filed: Feb. 13, 2020

(86) PCT No.: PCT/CN2020/074992
§ 371 (c)(1),
(2) Date: Apr. 12, 2020

(87) PCT Pub. No.: WO2021/138957
PCT Pub. Date: Jul. 15, 2021

(65) Prior Publication Data
US 2021/0405791 A1 Dec. 30, 2021

(30) Foreign Application Priority Data
Jan. 7, 2020 (CN) .......................... 202010012534.1

(51) Int. Cl.
G06F 3/041 (2006.01)

(52) U.S. Cl.
CPC .................................. *G06F 3/0412* (2013.01)

(58) Field of Classification Search
CPC ..................................................... G06F 3/0412
See application file for complete search history.

(56) References Cited

U.S. PATENT DOCUMENTS

| 2018/0059862 A1* | 3/2018 | Zeng | G06F 3/0443 |
| 2018/0124933 A1* | 5/2018 | Park | H01L 51/5212 |
| 2020/0150847 A1* | 5/2020 | Jang | G06F 3/0446 |
| 2020/0411596 A1* | 12/2020 | Guo | H01L 27/3258 |

FOREIGN PATENT DOCUMENTS

| CN | 106951125 A | 7/2017 |
| CN | 108039418 A | 5/2018 |
| CN | 110265459 A | 9/2019 |
| CN | 110399054 A | 11/2019 |

* cited by examiner

*Primary Examiner* — Ryan A Lubit
(74) *Attorney, Agent, or Firm* — Soroker Agmon Nordman

(57) ABSTRACT

A touch display panel is provided and includes a substrate, a thin-film encapsulation layer, a first dam, a second dam, and a touch control line. The substrate includes an active area and a non-active area. The thin-film encapsulation layer is disposed on, the substrate. The first dam and the second dam are positioned in the non-active area. The first dam and the second dam are disposed on the thin-film encapsulation layer. The thin-film encapsulation layer is bounded by the first dam. The touch control line is disposed on the thin-film encapsulation layer, the first dam, and the second dam. The first dam includes a first protruding portion or a first recessed portion correspondingly at an intersection of the first dam and the touch control line.

18 Claims, 3 Drawing Sheets

TOUCH DISPLAY PANEL

FIELD OF INVENTION

The present disclosure relates to the field of display technologies, and in particularly, to a touch display panel.

BACKGROUND OF INVENTION

Active matrix organic light-emitting diode (AMOLED) display panels have gradually become a new generation of display technologies because they possess characteristics of high contrast, wide color gamut, low power consumption, foldability, etc. Compared with liquid crystal display panel (LCD) technologies, a major advantage of AMOLEDs is that it can be applied to flexible display panels. Touch panels can be manufactured on a thin-film encapsulation layer. Compared with out-cell touch panels, the structures are simpler and thinner. Sealing and bonding processes of out-cell touch panels are reduced. Manufacturing processes are simple, thereby reducing manufacturing and material costs.

However, because of the step difference at the sealant, the photoresist located within the recess may be inadequately exposed when manufacturing touch control lines of existing touch display substrates, resulting in metal residues between the touch control lines and causing short circuits in the touch control lines. Touch sensitivity and product yield are affected.

Therefore, it is necessary to provide a touch display panel to solve the problems existing in the prior art.

Technical Problems

In view of this, the present disclosure provides a touch display panel to solve the problem that touch control lines of touch display panels in the prior art are short-circuited due to metal residues caused by incomplete etching.

SUMMARY OF INVENTION

To achieve the foregoing object of the present disclosure, an embodiment of the present disclosure provides a touch display panel, comprising:

a substrate comprising an active area and a non-active area;

a thin-film encapsulation layer disposed on the substrate;

a first dam and a second dam positioned in the non-active area, wherein the first dam and the second dam are disposed on the thin-film encapsulation layer and the thin-film encapsulation layer is bounded by the first dam; and a touch control, line disposed on the thin-film encapsulation layer, the first darn, and the second dam;

wherein the first dam comprises a first protruding portion or a first recessed portion correspondingly at an intersection of the first dam and the touch control line; and wherein the touch display panel is provided with two first dams, and the second dam covers one of the first dams.

In an embodiment of the present disclosure, the first protruding portion extends outwardly from a side of the first dam along a direction of the touch control line and the first protruding portion overlaps the touch control line.

In an embodiment of the present disclosure, the second dam comprises a second protruding portion or a second recessed portion correspondingly at an intersection of the second dam and the touch control line.

In an embodiment of the present disclosure, the second protruding portion extends outwardly from a side of the second dam along a direction of the touch control line and the second protruding portion overlaps the touch control line.

In an embodiment of the present disclosure, a width of the touch control line is less than a width of the first dam and a width of the second dam.

In an embodiment of the present disclosure, the thin-film encapsulation layer comprises an organic encapsulation layer and an inorganic encapsulation layer, the first dam and the second dam are disposed on the inorganic encapsulation layer, and the organic encapsulation layer is bounded by the first dam.

In an embodiment of the present disclosure, the touch display panel is provided with two first dams and the second dam covers one of the first dams.

In an embodiment of the present disclosure, the touch display panel further comprises a first insulating layer and the first insulating layer is disposed on the encapsulation layer.

In an embodiment of the present disclosure, the touch display panel further comprises a second insulating layer and the second insulating layer is disposed on a surface of the touch control line facing the thin-film encapsulation layer.

In an embodiment of the present disclosure, the touch display panel further comprises a first insulating layer and a second insulating layer, the first insulating layer and the second insulating layer are sequentially stacked on the first dam, and the first insulating layer and the second insulating layer are sequentially stacked on the second dam.

Another embodiment of the present disclosure provides a touch display panel, comprising:

a substrate, comprising an active area and a non-active area;

a thin-film encapsulation layer disposed on the substrate;

a first dam and a second dam positioned in the non-active area, wherein the first dam and the second dam are disposed on the thin-film encapsulation layer and the thin-film encapsulation layer is bounded by the first dam; and a touch control line disposed on the thin-film encapsulation layer, the first dam, and the second dam;

wherein the first dam comprises a first protruding portion or a first recessed portion correspondingly at an intersection of the first dam and the touch control line.

In an embodiment of the present disclosure, the first protruding portion extends outwardly from a side of the first dam along a direction of the touch control line and the first protruding portion overlaps the touch control line.

In an embodiment of the present disclosure, the second dam comprises a second protruding portion or a second recessed portion correspondingly at an intersection of the second dam and the touch control line.

In an embodiment of the present disclosure, the second protruding portion extends outwardly from a side of the second dam along a direction of the touch control line and the second protruding portion overlaps the touch control line.

In an embodiment of the present disclosure, a width of the touch control line is less than a width of the first dam and a width of the second dam.

In an embodiment of the present disclosure, the thin-film encapsulation layer comprises an organic encapsulation layer and an inorganic encapsulation layer, the first dam and the second dam are disposed on the inorganic encapsulation layer, and the organic encapsulation layer is bounded by the first dam.

In an embodiment of the present disclosure, the touch display panel further comprises a first insulating layer and the first insulating layer is disposed on the thin-film encapsulation layer.

In an embodiment of the present disclosure, the touch display panel further comprises a second insulating layer and the second insulating layer is disposed on a surface of the touch control line facing the thin-film encapsulation layer.

In an embodiment of the present disclosure, the touch display panel further comprises a first insulating layer and a second insulating layer, the first insulating layer and the second insulating layer are sequentially stacked on the first dam, and the first insulating layer and the second insulating layer are sequentially stacked on the second dam.

Beneficial Effects:

Compared with the prior art, the first dam and the second dam of the touch display panel of the present disclosure extend outward or retract inward along the direction of the touch control line. The first dam and the second dam overlap the touch control line to form a zigzag structure corresponding to the touch control line, which can extend the remaining path of the touch control line along sides of the first darn and the second dam so that metal residues can hardly remain at the adjacent metal lines. The touch control lines are prevented from being short-circuited, thereby ensuring touch sensitivity and improving product yield. In addition, the first dam and the second dam extend a path where ambient water and oxygen enter the interior from edges of the touch display panel, which prevents water vapor from corroding internal components, affecting display and touch performances, and extending lifespans of the panels.

DESCRIPTION OF DRAWINGS

For a better understanding of the aforementioned content of the present invention, preferable embodiments are illustrated in accordance with the attached figures for detailed explanation.

DETAILED DESCRIPTION OF PREFERRED EMBODIMENTS

In the following detailed description, reference is made to the accompanying figures, in which various examples are shown by way of illustration. In this regard, directional terminology mentioned in the present disclosure, such as "top", "bottom", "front", "back", "left", "right", "inner", "outer", "lateral", "side", "surrounding", "center", "horizontal", "transverse", "vertical", "longitudinal", "axial", "radial", "uppermost" or "lowermost", etc., is used with reference to the orientation of the figures being described. Therefore, the directional terminology is used for purposes of illustration and is not intended to limit the present invention. In the accompanying figures, units with similar structures are indicated by the same reference numbers.

The terms "comprise", "includes", and their conjugates mean "including but not limited to".

The terms "a", "an" and "at least one of" as used herein include plural references unless the context clearly dictates otherwise. For example, the term "a processing module" or "at least one processing module" may include a plurality of processing modules, including combination thereof.

It is noted that the terms "a plurality of" and "several" as used herein may be selected from two, three, or more unless the context clearly dictates otherwise and "at least one" may be selected from one, two, three, or more unless otherwise indicated.

Figure 1:
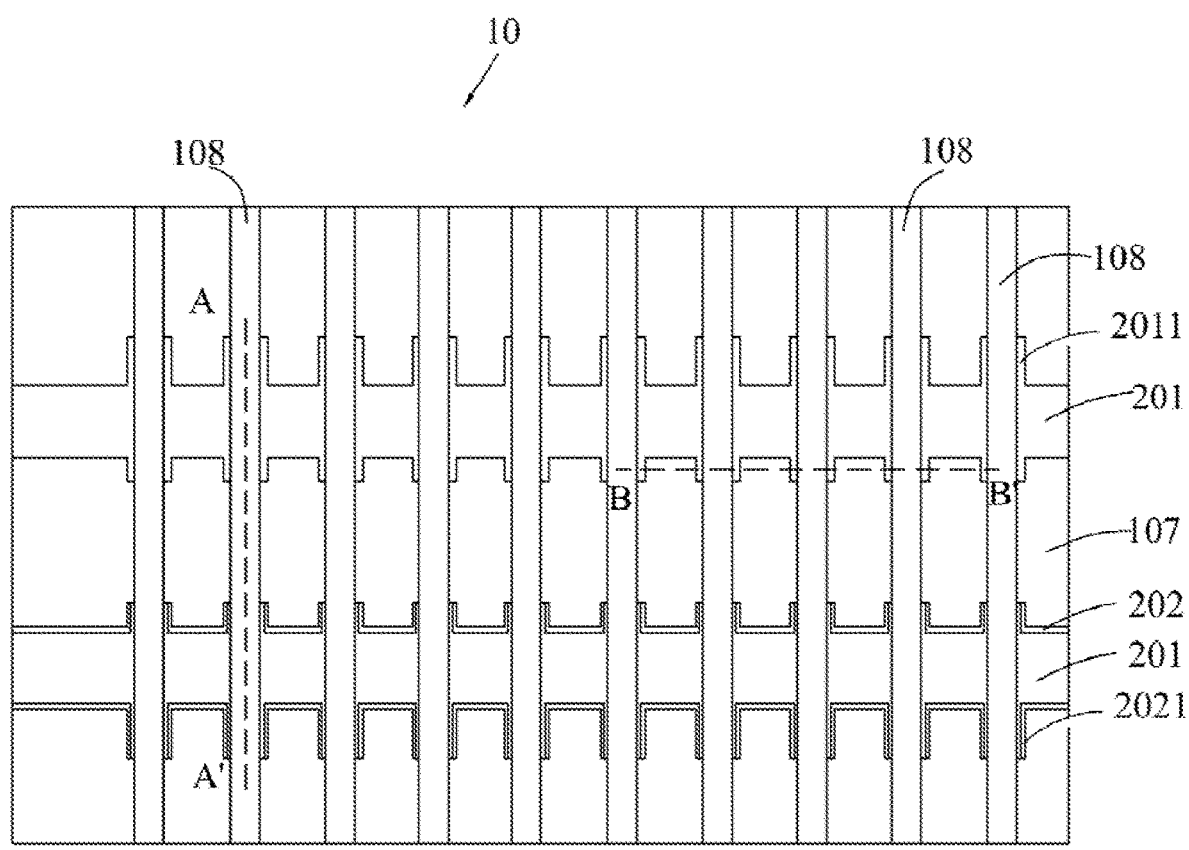
FIG. 1 is a top view of a touch display panel according to a first embodiment of the present disclosure.
Figure 2:
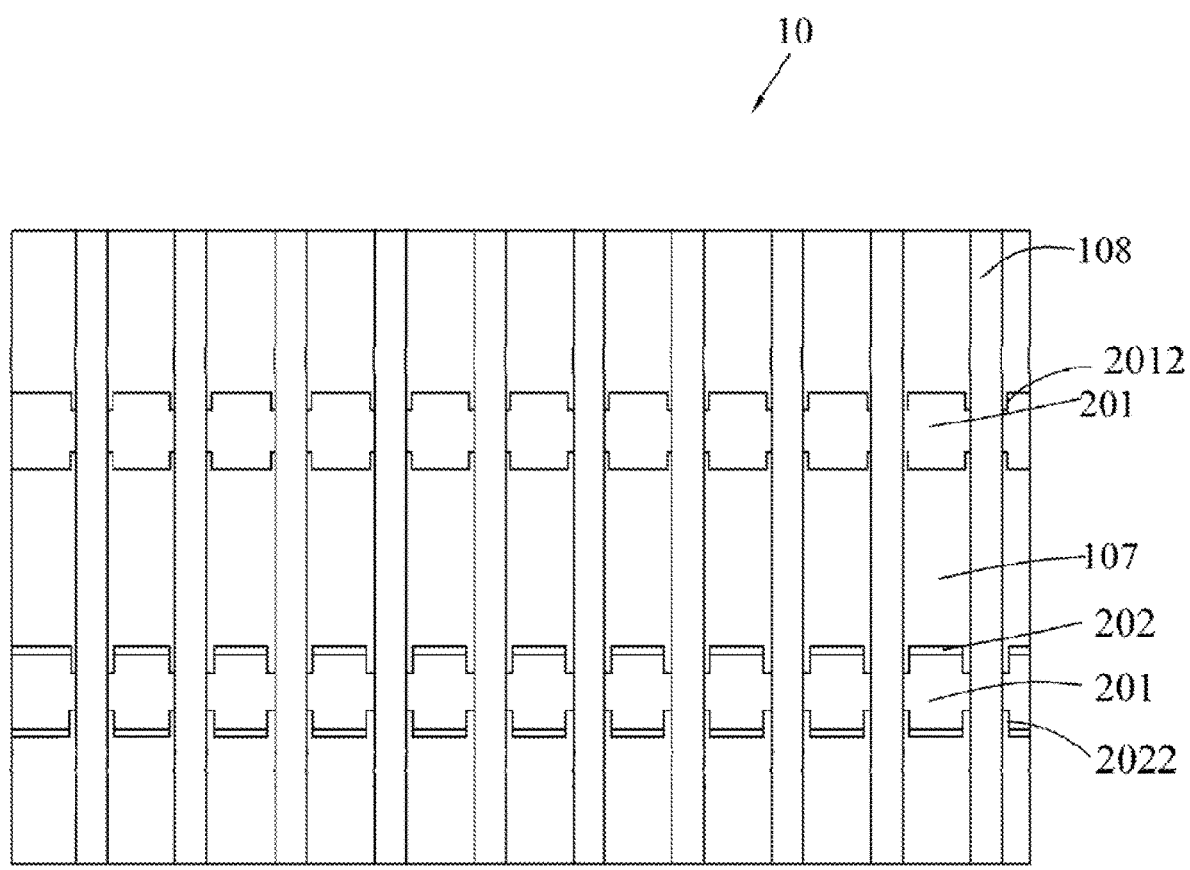
FIG. 2 is a top view of a touch display panel according to a second embodiment of the present disclosure.

Please refer to FIG. 1 and FIG. 2, FIG. 1 is a top view of a touch display panel according to a first embodiment of the present disclosure. FIG. 2 is a top view of a touch display panel according to a second embodiment of the present disclosure.

As shown in FIG. 1, the touch display panel 10 according to the first embodiment of the present disclosure includes a substrate 101, a plurality of thin-film encapsulation layers 102, 103, 104, 106, a first dam 201, a second dam 202, and a touch control line 108.

The substrate 101 includes an active area 11 and a non-active area 12. Examples of material of the substrate may include one of organic polymers such as polyimide, polycarbonate, polyethylene terephthalate, or polyethersulfone.

The thin-film encapsulation layers 102, 103, 104, 106 are disposed on the substrate 101, The thin-film encapsulation layers 102, 103, 104, 106 include organic encapsulation layers 103, 104, 106 and inorganic encapsulation layers 102. The organic encapsulation layers 103, 104, 106 and the inorganic encapsulation layer 102 form an inorganic/organic laminated structure. In an embodiment of the present disclosure, the thin-film encapsulation layers 102, 103, 104, and 106 include an inorganic encapsulation layer 102, a first organic encapsulation layer 103, a second organic encapsulation layer 104, and a third organic encapsulation layer 106, which are sequentially disposed on the substrate 101 to form an inorganic/organic/organic laminated structure. The second organic encapsulation layer 104 covers the entire first organic encapsulation layer 103. The third organic encapsulation layer 106 covers the entire second organic encapsulation layer 104 and further extends the path where water and oxygen enter the internal components. It can prevent water and oxygen from infiltrating into the inorganic encapsulation layer which is prone to fracture due to excessive stress caused by flexible bending and enhance bending resistance of the thin-film encapsulation layers 102, 103, 104, and 106.

Examples of material of the inorganic encapsulation layer 102 may include silicon nitride, aluminum nitride, zirconium nitride, titanium nitride, tantalum nitride, titanium oxide, aluminum nitride oxide, and silicon nitride oxide. The first inorganic encapsulation layer 102 may be deposited on the substrate 101 by, for example, an atomic layer deposition or a chemical vapor deposition process.

Examples of material of the organic encapsulation layers 103, 104, 106 may include epoxy resin, acryl-based resin, polyimide resin, polyethylene naphthalene dicarboxylate, and polyethylene terephthalate.

The first dam 201 and the second dam 202 are located in the non-active area 12. The first dam 201 and the second dam 202 are disposed on the thin-film encapsulation layers 102, 103, 104, and 106. In an embodiment of the present disclosure, the first dam 201 is disposed on the inorganic encapsulation layer 102 and is located at edges of the organic encapsulation layers 103, 104, and 106. The first dam 201 defines a boundary of the third organic encapsulation layer 106 to prevents the excessive third organic encapsulation layer 106 from spreading to an undesired position of the touch display panel 10. Meanwhile, the first dam 201 and the second dam 202 extend the path Where ambient water and oxygen enter the interior from the edges of the touch display panel 10 so as to prevent water vapor from corroding internal components and affecting display and touch performance, thereby extending lifespan of the panel.

The touch control line 108 are disposed on the thin-film encapsulation layers 102, 103, 104, and 106, Specifically, the touch control line 108 may be disposed on the third organic encapsulation layer 106. The touch control line 108 is formed by sputtering a metal layer on the thin-film encapsulation layers 102, 103, 104, and 106 to etch the metal layer so as to obtain a patterned touch control line 108. The touch control line 108 includes a first touch control line and a second touch control line which are insulated from each other. The first touch control line extends in a first predetermined direction. The second touch control line extends in a second predetermined direction. The second touch control line is disconnected at the intersection of the second touch control line and the first touch control line.

Examples of material of the metal layer include metals such as gold, silver, copper, iron, tin, lead, hafnium, tungsten, molybdenum, neodymium, titanium, tantalum, aluminum, and zinc, alloys thereof, and combinations thereof.

The photolithography process is one kind of patterning processes, and, for example can comprise: steps of preprocessing, forming a base film, coating, baking a photoresist, exposing, developing, etching and others. For example, the preprocessing commonly includes steps of wet cleaning, deionized water cleaning, dewatering baking and others; for example, the base film forming can be achieved by using vapor deposition, magnetron sputtering and other methods; for example, the photoresist coating can be achieved through static adhesive coating or dynamic adhesive coating; the baking can be used for removing a solvent in photoresist or a solvent after the developing step. Besides, the photolithography process can also comprise: steps of hardening baking, developing inspection and others. Steps in the photolithography process, which are used when a white photoresist layer and a black photoresist layer are formed, and the number of using the steps are not limited in the description, as long as the white photoresist layer and the black photoresist layer can be formed. For example, the photolithography process may also comprise several of the above steps. For example, the photolithography process comprises photoresist coating, the exposing, developing and other steps.

In the first embodiment of the present disclosure, the first dam 201 extends outwardly along a direction of the touch control line 108 and overlaps the touch control line 108 at an intersection of the first dam 201 and the touch control line 108. The first dam 201 has a first protruding portion 2011 or a first depressed portion 2021 correspondingly at the intersection of the first dam 201 and the touch control line 108. The second dam 202 extends outwardly along the direction of the touch control line 108 and overlaps the touch control line 108 at an intersection of the second dam 202 and the touch control line 108. The second dam 202 has a second protruding portion 2012 or a second recessed portion 2022 correspondingly at the intersection of the second dam 202 and the touch control line 108.

As shown in FIG. 2, differences between the second embodiment and the first embodiment of the present disclosure are that the first dam. 201 is retract inwardly along the direction of the touch control line 108 at the intersection of the first dam 201 and the touch control line 108. The second dam 202 is retracted inwardly along the direction of the touch control line 108 at the intersection of the second dam 202 and the touch control line 108.

The first dam 201 and the second dam 202 of the embodiments of the present disclosure have a zigzag structure corresponding to the touch control line 108. The zigzag structure can extend the remaining path of the touch control line 108 along the sides of the first dam 201 and the second dam 202, so that the adjacent touch control line 108 can hardly remained thereon, and the touch control lines 108 is prevented from being short-circuited.

Figure 3:
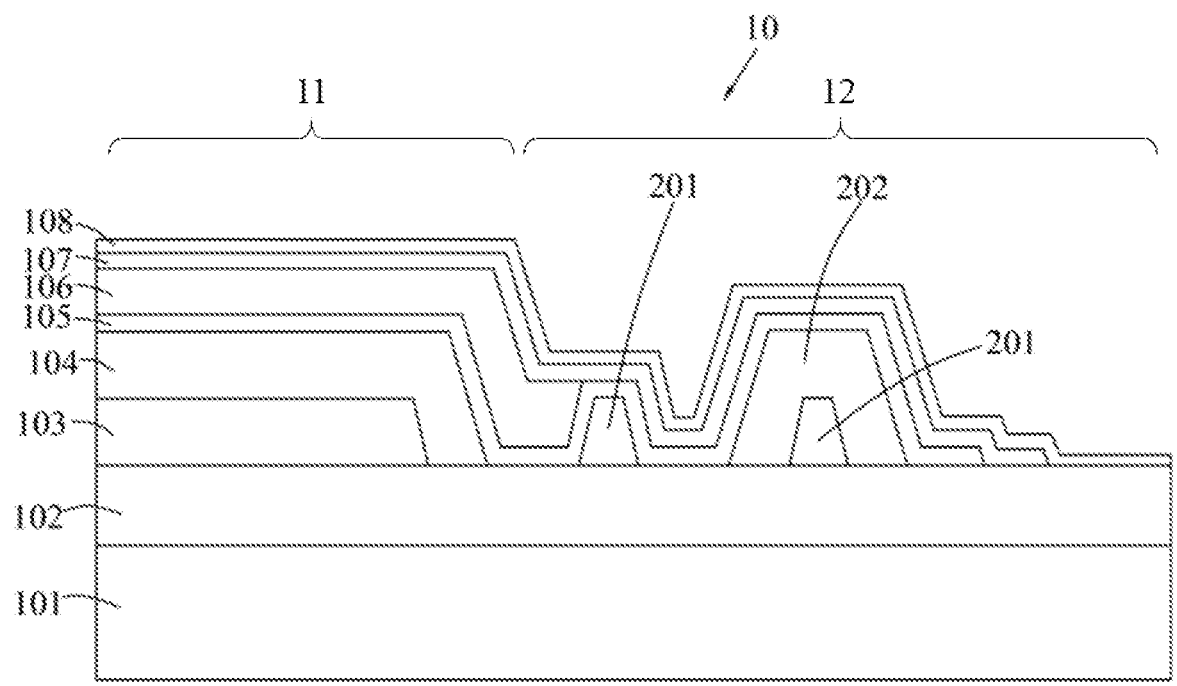
FIG. 3 is a schematic structural view of the touch display panel of FIG. 1 taken along line A-A'.

As shown in FIG. 3. FIG. 3 is a schematic structural view of the touch display panel of FIG. 1 taken along a line A-A'. The touch display panel 10 is provided with two first dams 201. The second dam 202 covers the first dam 201. A height of the second dam 202 is greater than a height of the first dam 201. Therefore, the second dam 202 further blocks the excessive amount of the third organic encapsulation layer 106 that exceeds beyond the first dam 201, from diffusing to an undesired place.

The touch display panel 10 further includes a first insulating layer 105 and a second insulating layer 107. The first insulating layer 105 is disposed on the thin-film encapsulation layers 102, 103, 104, and 106. The second insulating layer 107 is disposed on a surface of the touch control line 108 facing the thin-film encapsulation layers 102, 103, 104, and 106. The first insulating layer 105 and the second insulating layer 107 may be inorganic insulating layers.

In an embodiment of the present disclosure, the first insulating layer 105 and the second insulating layer 107 are sequentially stacked on the first dam 201. The first insulating layer 105 and the second insulating layer 107 are sequentially stacked on the second dam 202.

The third organic encapsulation layer 106 is disposed between the first insulating layer 105 and the second insulating layer 107. The first insulating layer 105 and the second insulating layer 107 restrict the area which the third organic encapsulation spreads to, so that the third organic encapsulation layer 106 abuts against the first dam 201.

Figure 4:
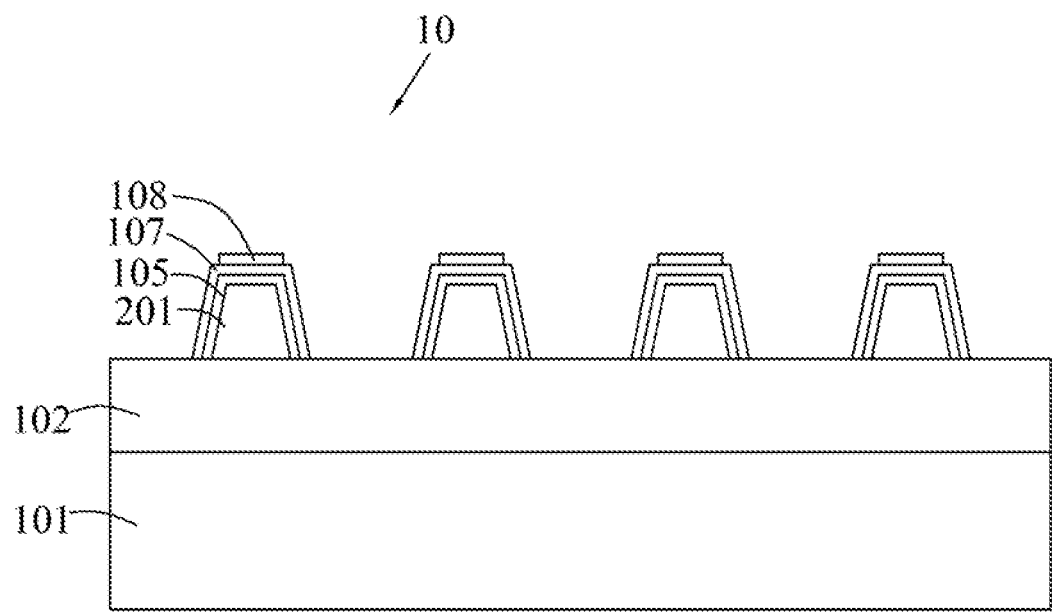
FIG. 4 is a schematic structural view of the touch display panel of FIG. 1 taken along line B-B'.

As shown in FIG. 4, FIG. 4 is a schematic structural view of the touch display panel of FIG. 1 taken along a line B-B'. The touch control line 108 is disposed on the first dam 201 and the second dam 202. A width of the touch control line 108 is lesser than a width of the first dam 201 and a width of the second dam 202. In an embodiment of the present disclosure, the touch control line 108 is disposed on the first insulating layer 105 and/or the second insulating layer 107. A width of the touch control line 108 is lesser than a width of the first insulating layer 105 and/or the second insulating layer 107.

Because the first dam 201 extends outwardly along the direction of the touch control line 108 to form the first protruding portion 2011, a stepped area between the touch control line 108 and the first protruding portion 2011 is away from the sides of the first dam 201, thereby preventing the touch control line 108 from being short-circuited because of the metal residues remaining at the sides of the first dam 201 caused by incomplete etching. Similarly, because the second dam 202 extends outwardly along the direction of the touch control line 108 to form the second protruding portion 2012, a stepped area between the touch control line 108 and the second protruding portion 2012 is away from the sides of the second dam 202, thereby preventing the touch control line 108 from being short-circuited because of the metal residues remaining at the sides of the second dam 202 caused by incomplete etching.

Similarly, because the first dam 201 retracted inwardly along the direction of the touch control line 108 to form the first recessed portion 2021, a stepped area between the touch control line 108 and the first recessed portion 2021 is away from the sides of the first dam 201, thereby preventing the touch control line 108 from being short-circuited because of the metal residues remaining at the sides of the first dam 201 caused by incomplete etching. Similarly, because the second dam 202 retracted inwardly along the direction of the touch control line 108 to form the second recessed portion 2022, a stepped area between the touch control line 108 and the second recessed portion 2022 is away from the sides of the second dam 202, thereby preventing the touch control line 108 from being short-circuited because of the metal residues remaining at the sides of the second dam 202 caused by incomplete etching.

Compared with the prior art, the first dam and the second dam of the touch display panel of the present disclosure extend outward or retract inward along the direction of the touch control line. The first dam and the second dam overlap the touch control line to form a zigzag structure corresponding to the touch control line, which can extend the remaining path of the touch control line along sides of the first dam and the second dam so that metal residues can hardly remain at the adjacent metal lines. The touch control lines are prevented from being short-circuiteded, thereby ensuring touch sensitivity and improving product yield. In addition, the first dam and the second dam extend a path where ambient water and oxygen enter the interior from edges of the touch display panel, which prevents water vapor from corroding internal components, affecting display and touch performances, and extending lifespan of the panels.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:
1. A touch display panel, comprising:
a substrate comprising an active area and a non-active area;
a thin-film encapsulation layer disposed on the substrate;
a first dam and a second dam positioned in the non-active area, wherein the first dam and the second dam are disposed on the thin-film encapsulation layer and the thin-film encapsulation layer is bounded by the first dam; and
a touch control line disposed on the thin-film encapsulation layer, the first dam, and the second dam;
wherein the first dam comprises a first protruding portion or a first recessed portion correspondingly at an intersection of the first dam and the touch control line; and
wherein the touch display panel is provided with first dams, and the second dam covers one of the first dams.

2. The touch display panel of claim 1, wherein the first protruding portion extends outwardly from a side of the first dam along a direction of the touch control line and the first protruding portion overlaps the touch control line.

3. The touch display panel of claim 1, wherein the second dam comprises a second protruding portion or a second recessed portion correspondingly at an intersection of the second dam and the touch control line.

4. The touch display panel of claim 3, wherein the second protruding portion extends outwardly from a side of the second dam along a direction of the touch control line and the second protruding portion overlaps the touch control line.

5. The touch display panel of claim 1, wherein a width of the touch control line is less than a width of the first dam and a width of the second dam.

6. The touch display panel of claim 1, wherein the thin-film encapsulation layer comprises an organic encapsulation layer and an inorganic encapsulation layer, the first dam and the second dam are disposed on the inorganic encapsulation layer, and the organic encapsulation layer is bounded by the first dam.

7. The touch display panel of claim 1, wherein the touch display panel further comprises a first insulating layer and the first insulating layer is disposed on the thin-film encapsulation layer.

8. The touch display panel of claim 1, wherein the touch display panel further comprises a second insulating layer and the second insulating layer is disposed on a surface of the touch control line facing the thin-film encapsulation layer.

9. The touch display panel of claim 1, wherein the touch display panel further comprises a first insulating layer and a second insulating layer, the first insulating layer and the second insulating layer are sequentially stacked on the first dam, and the first insulating layer and the second insulating layer are sequentially stacked on the second dam.

10. A touch display panel, comprising:
a substrate, comprising an active area and a non-active area;
a thin-film encapsulation layer disposed on the substrate;
a first dam and a second dam positioned in the non-active area, wherein the first dam and the second dam are disposed on the thin-film encapsulation layer and the thin-film encapsulation layer is bounded by the first dam; and
a touch control line disposed on the thin-film encapsulation layer, the first dam, and the second dam;
wherein the first dam comprises a first protruding portion or a first recessed portion correspondingly at an intersection of the first dam and the touch control line.

11. The touch display panel of claim 10, wherein the first protruding portion extends outwardly from a side of the first dam along a direction of the touch control line and the first protruding portion overlaps the touch control line.

12. The touch display panel of claim 10, wherein the second dam comprises a second protruding portion or a second recessed portion correspondingly at an intersection of the second dam and the touch control line.

13. The touch display panel of claim 12, wherein the second protruding portion extends outwardly from a side of the second dam along a direction of the touch control line and the second protruding portion overlaps the touch control line.

14. The touch display panel of claim 10, wherein a width of the touch control line is less than a width of the first dam and a width of the second dam.

15. The touch display panel of claim 10, wherein the thin-film encapsulation layer comprises an organic encapsulation layer and an inorganic encapsulation layer, the first dam and the second dam are disposed on the inorganic encapsulation layer, and the organic encapsulation layer is bounded by the first dam.

16. The touch display panel of claim 10, wherein the touch display panel further comprises a first insulating layer and the first insulating layer is disposed on the thin-film encapsulation layer.

17. The touch display panel of claim 10, wherein the touch display panel further comprises a second insulating layer and the second insulating layer is disposed on a surface of the touch control line facing the thin-film encapsulation layer.

18. The touch display panel of claim 10, wherein the touch display panel further comprises a first insulating layer and a second insulating layer, the first insulating layer and the second insulating layer are sequentially stacked on the first dam, and the first insulating layer and the second insulating layer are sequentially stacked on the second dam.

* * * * *

UNITED STATES PATENT AND TRADEMARK OFFICE
CERTIFICATE OF CORRECTION

| | | |
|---|---|---|
| PATENT NO. | : 11,256,350 B2 | Page 1 of 1 |
| APPLICATION NO. | : 16/755579 | |
| DATED | : February 22, 2022 | |
| INVENTOR(S) | : Sisi Zhou and Ningkun Peng | |

It is certified that error appears in the above-identified patent and that said Letters Patent is hereby corrected as shown below:

On the Title Page

Item (73), ASSIGNEE
Delete "WUHAN STAR OPTOELECTRONICS SEMICONDUCTOR DISPLAY TECHNOLOGY CO., LTD." and insert --WUHAN CHINA STAR OPTOELECTRONICS SEMICONDUCTOR DISPLAY TECHNOLOGY CO., LTD.--.

Signed and Sealed this
Fifteenth Day of August, 2023

Katherine Kelly Vidal
*Director of the United States Patent and Trademark Office*